(No Model.)

M. C. ARNOT.
LAMP.

No. 597,933. Patented Jan. 25, 1898.

Witnesses
C. Tracey Stagg.
A. S. Diven

Inventor
Matthias C. Arnot
by Eugene Diven
Attorney

UNITED STATES PATENT OFFICE.

MATTHIAS C. ARNOT, OF ELMIRA, NEW YORK.

LAMP.

SPECIFICATION forming part of Letters Patent No. 597,933, dated January 25, 1898.

Application filed March 5, 1897. Serial No. 626,076. (No model.)

*To all whom it may concern:*

Be it known that I, MATTHIAS C. ARNOT, a citizen of the United States, residing at Elmira, in the county of Chemung and State of New York, have invented certain new and useful Improvements in Lamps, of which the following is a specification.

My invention relates to improvements in lamps or lanterns adapted for bicycle and other purposes, and applies more in particular to the lamps for burning acetylene gas described in the applications of John C. Gallagher for Letters Patent, Serial Nos. 607,520 and 616,111, filed October 1, 1896, and December 18, 1896, respectively; and the object of my improvements is to provide a construction whereby the parts of the lamp may be readily separated for cleaning, repairs, &c. I accomplish this object by the construction illustrated in the accompanying drawings, in which—

Figure 1:
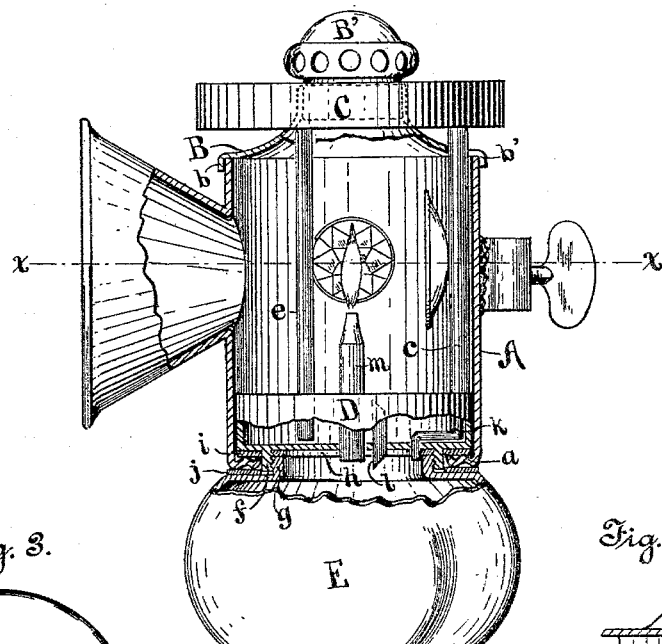
Figure 3:
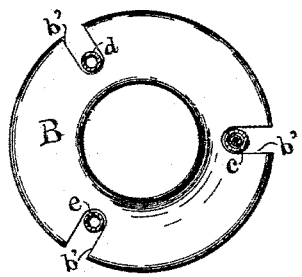
Figure 2:
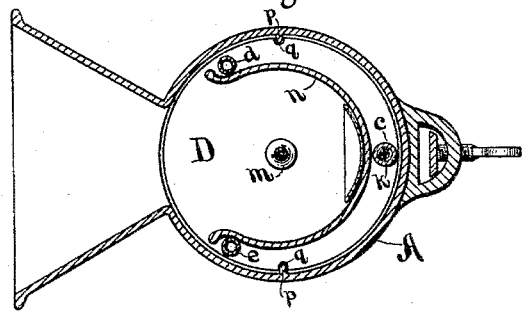

Figure 1 is an elevation of a bicycle-lamp embodying my improvements, parts being shown in section; Fig. 2, a sectional view of the lamp on the line $x\,x$ in Fig. 1; Fig. 3, a plan view of the dome of the lamp, the tank and chimney-cap being removed; and Fig. 4, a partial section of a modified form of coupling.

Similar letters refer to similar parts throughout the several views.

A is the shell of the lamp, tubular in form and provided with the usual headlight, side lights, vents, clamp, &c.

The lower portion of this shell is provided with an inward projection, which is shown in Fig. 1 as a flange $a$, this flange being corrugated, for a purpose which will presently appear. This inward projection of the shell is engaged by a coupling between the upper and lower portions of the lamp, the parts of which coupling are so formed as to provide an annular groove to receive the projection.

In the lamp illustrated, D is the auxiliary receptacle of the Gallagher device above referred to, and is made so as to be slipped down within shell A. It is provided below its bottom with a ring $f$, somewhat smaller in diameter and threaded internally to form the female member of the coupling. On the reservoir or generating-chamber E, around its mouth, is a collar $g$, which forms the male member of the coupling. The bottom of D and top of E are carried straight out from the ring $f$ and collar $g$ for a short distance, so as to form between them a groove adapted to receive the inward projection on shell A. Collar $g$ is intended to screw up tightly against a packing-ring $h$ to make a gas-tight joint. On either side of flange $a$ I prefer to place gaskets $i$ and $j$, of asbestos or other non-conductive material, and the groove between D and E is made of such width as to firmly clamp flange $a$ between these gaskets when the collar $g$ has been screwed home. The corrugations on the flange allow it to be compressed between the gaskets sufficiently to permit collar $g$ to be screwed up tight against packing $h$. They also cause the shell to be more firmly held in place.

Three tubes $c$, $d$, and $e$ extend upward from receptacle D and support above it the annular supply-tank C at the distance necessary to give the required head of flow from the tank. Below tank C is the dome B, provided with slits $b'\,b'\,b'$ around its periphery, corresponding with the positions of the tubes $c\,d\,e$. These slits allow the dome to be inserted or removed from beneath the tank. They are cut slightly wider than the outside diameter of the tubes, so as to give a little play, and when the shell has been removed by sliding the dome down and tilting it toward two of the tubes the slot engaging the third tube may be thrown up, so that the edge of the dome will clear said tube, after which a twist to the side will free the dome from the other two tubes. The dome rises up through the central space surrounded by the tank and receives the chimney-cap B', which slides down inside the collar-like extension of the dome, as indicated in the broken lines in Fig. 1, into which collar the cap is screwed or otherwise fastened. A flange $b$, turned down from the base of the dome, is adapted to slip down tightly around the top of the shell and to hold the dome securely in place.

Figure 4:
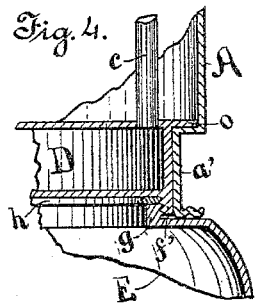

In assembling the lamp the dome is first placed in position beneath the tank and the chimney-cap is placed in position. The receptacle D is then slipped down into the shell and the dome pressed into place on top of the shell. Finally, reservoir E is screwed up against receptacle D and the parts of the lamp are all fastened firmly and securely together. In order to cause the receptacle D to take its proper position within the shell, so as to bring reflector and headlight into line, I provide grooves $q$ in the wall of the receptacle, which engage suitable projections $p$ from the shell. In Fig. 4 I have shown a modification in which the groove of the coupling is wider than in Fig. 1, the top wall of the groove being formed by a projection $o$ from the top of the receptacle D. The ring $f'$ is of the same outside diameter as the receptacle. The shell has the inward projection $a'$ formed as an extension of smaller diameter, with its lower extremity bent out to form a flange to engage the top of reservoir E. This forms a stiffer connection than the construction first described.

I prefer to use the non-conductive gaskets between the inward projection of the shell and the walls of the groove, as this prevents in great measure conduction of heat from the shell to the receptacle and reservoir, which are to be kept as cool as possible. In Fig. 2 I have shown a shield $n$, which may be placed between the tubes $c\ d\ e$ and the burner, thus inclosing them in a cool-air space.

Tubes $c$, $d$, and $e$, in addition to forming supports for tank C, are utilized for feeding the water from the tank to the receptacle and for regulating the feed. Tube $l$ feeds water from the receptacle to the generating-chamber, and $m$ is the burner-tube. It is not necessary to describe here the operation of the lamp, as my invention does not concern this part of the device, but lies wholly in the manner of constructing and putting the parts of the lamp together.

I do not confine myself to the form of lamp herein shown and described, as it is quite evident that the essential features of construction may be applied equally well to the lamp described in Gallagher's application, first mentioned, in which the auxiliary receptacle is omitted. It is also quite evident that the invention can be applied with equal facility to oil-lamps, where the lamp-burner will take the place of the receptacle, there being no elevated tank to be supported above the lamp-dome in such case.

What I claim as my invention, and desire to secure by Letters Patent, is—

1. In a lamp, the combination of a shell provided with an inward projection at its base, a reservoir, and a coupling, one part of which is formed on the reservoir and the other part of which is adapted to slip down within the shell and to form with the first part a groove within which the inward projection is clamped.

2. In a lamp, the combination of a shell provided with a corrugated inward projection at its base, a reservoir, and a coupling, one part of which is formed on the reservoir and the other part of which is adapted to slip down within the shell and to form with the first part a groove within which the inward projection is clamped.

3. In a lamp of the type described, the combination with the tank E, the auxiliary receptacle C, the connecting tubes or columns, and the removable shell, of a dome adapted to fit over the top of the shell beneath the tank and provided with slots cut in from the periphery to correspond with the location of the tubes, whereby the dome may be removed in the manner set forth.

In testimony whereof I have affixed my signature in presence of two witnesses.

MATTHIAS C. ARNOT.

Witnesses:
C. A. BOWMAN,
JOHN C. GREVES.